US011996228B2

(12) United States Patent
Fuchs

(10) Patent No.: US 11,996,228 B2
(45) Date of Patent: May 28, 2024

(54) DEVICE FOR REDUCING HIGH-FREQUENCY INTERFERENCES OF A TRANSFORMER

(71) Applicant: ebm-papst Mulfingen GmbH & Co. KG, Mulfingen (DE)

(72) Inventor: Andreas Fuchs, Mulfingen (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 620 days.

(21) Appl. No.: 17/268,974

(22) PCT Filed: Aug. 20, 2019

(86) PCT No.: PCT/EP2019/072233

§ 371 (c)(1),
(2) Date: Feb. 17, 2021

(87) PCT Pub. No.: WO2020/038923

PCT Pub. Date: Feb. 27, 2020

(65) Prior Publication Data

US 2021/0327643 A1 Oct. 21, 2021

(30) Foreign Application Priority Data

Aug. 20, 2018 (DE) ..................... 10 2018 120 181.8

(51) Int. Cl.
*H01F 27/24* (2006.01)
*H01F 27/28* (2006.01)
(Continued)

(52) U.S. Cl.
CPC ......... *H01F 27/2885* (2013.01); *H01F 27/24* (2013.01); *H01F 27/289* (2013.01); *H01F 27/29* (2013.01); *H01F 27/363* (2020.08)

(58) Field of Classification Search
CPC .... H01F 27/2885; H01F 27/24; H01F 27/289; H01F 27/29; H01F 27/363; H01F 27/36; H01F 27/38
See application file for complete search history.

(56) References Cited

U.S. PATENT DOCUMENTS 6,982,621 B2 * 1/2006 Park ........................ H02M 3/28 336/84 R
7,868,724 B2 * 1/2011 Sicong .................. H01F 27/363 336/84 R

FOREIGN PATENT DOCUMENTS

DE 7813143 U1 9/1978
DE 2832715 A1 2/1980
(Continued)

OTHER PUBLICATIONS

European Patent Office, Rijswijk, Netherlands, International Search Report of International Application No. PCT/EP2019/072233, dated Dec. 5, 2019, 2 pages.

*Primary Examiner* — Tuyen T Nguyen
(74) *Attorney, Agent, or Firm* — Dickinson Wright PLLC

(57) ABSTRACT

A device for reducing high-frequency interferences between first and second windings of a transformer that includes a first winding ($W_1$) and a second winding ($W_2$), which are wound around a common core, wherein the first winding ($W_1$) is an interference-emitting winding and a shielding winding ($W_S$) or a shielding film ($W_S$) is arranged between the first winding ($W_1$) and the second winding ($W_2$), wherein the shielding winding ($W_S$) and the core are connected to the reference potential (B) of the first winding ($W_1$).

16 Claims, 7 Drawing Sheets

(51) Int. Cl.
*H01F 27/29* (2006.01)
*H01F 27/36* (2006.01)

(56) References Cited

FOREIGN PATENT DOCUMENTS

| | | | |
|---|---|---|---|
| DE | 3601475 | A1 | 7/1987 |
| DE | 3940025 | A1 | 6/1991 |
| EP | 2428967 | A1 | 3/2012 |
| KR | 20160107017 | A | 9/2016 |
| WO | 0223707 | A1 | 3/2002 |
| WO | 2014178589 | A1 | 11/2014 |

* cited by examiner

DEVICE FOR REDUCING HIGH-FREQUENCY INTERFERENCES OF A TRANSFORMER

CROSS REFERENCE TO RELATED APPLICATIONS

This application is a 35 U.S.C. § 371 national phase application of International Application No.: PCT/EP2019/072233, filed Aug. 20, 2019, which claims the benefit of priority under 35 U.S.C. § 119 to German Patent Application No.: 10 2018 120 181.8, filed Aug. 20, 2018, the contents of which are incorporated herein by reference in their entirety.

FIELD

The invention relates to a device for reducing high-frequency interferences between a first winding and a second winding of a transformer, which are wound around a common core.

BACKGROUND

The statements in this section merely provide background information related to the present disclosure and several definitions for terms used in the present disclosure and may not constitute prior art.

DE 3601475 A1 relates to a transformer, which is simple to produce and has a high asymmetry damping. The one shielding winding made up of two simultaneously applied windings is proposed, wherein the beginning of the first winding and the end of the second winding are connected to the reference potential of an asymmetrically operated winding, while the end of the first winding and the beginning of the second winding remain unconnected.

DE 2832715 A1 discloses a typical arrangement of an installation transformer having grounded shielding to avoid leakage currents. The primary side is connected to the grid, the secondary side supplies the device and is enclosed by a grounded shield or in any case covered in relation to the primary site. Leakage currents from the primary side are thus absorbed at the shield without reaching the device.

These measures do reduce the high-frequency interferences, but cannot remedy them to a sufficient extent. Further measures are known in the prior art, which either cannot be implemented simply and cost-effectively or do not display the desired effect, however.

SUMMARY

An objective of the present disclosure is to provide a device which overcomes the above-mentioned disadvantages, is producible cost-effectively, and further optimizes the reduction of high-frequency interferences between a first winding and a second winding of a transformer, which are wound around a common core.

This object is achieved by the combination of the following features in a device for reducing high-frequency interferences between a first winding (W1) and a second winding (W2) of a transformer. The first winding (W1) and the second winding (W2) are wound around a common core, wherein the first winding (W1) is an interference-emitting winding and a shielding winding (WS) or a shielding film (WS) is arranged between the first winding (W1) and the second winding (W2), wherein the shielding winding (WS) and the core are connected to the reference potential (B) of the first winding (W1).

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
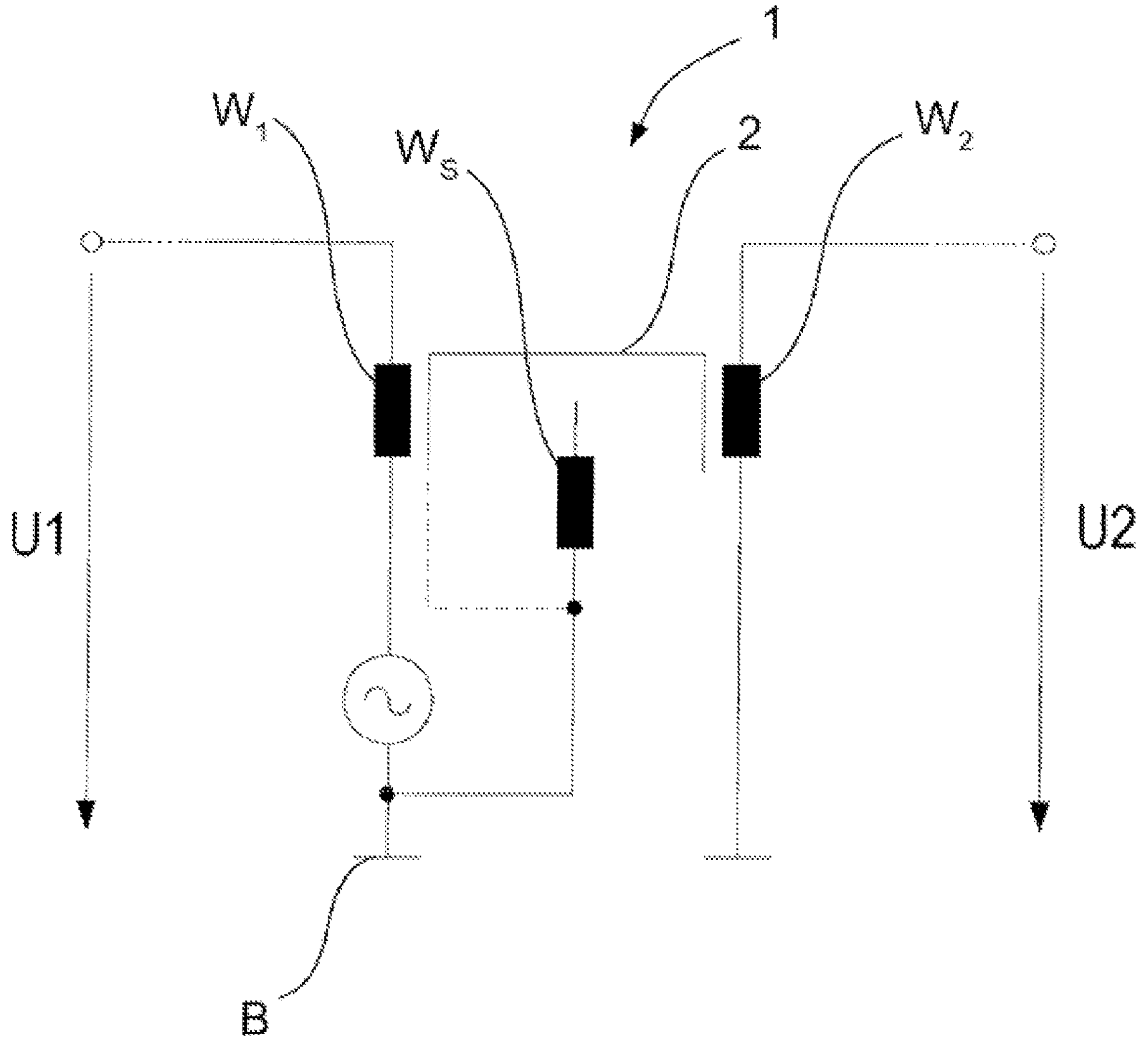
FIG. 1 shows an equivalent circuit diagram of a device for reducing high-frequency interferences of a transformer.

The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

According to one aspect of the present disclosure, a device for reducing high-frequency interferences between a first winding and a second winding of a transformer, which are wound around a common core, is therefore proposed, wherein the first winding represents an interference-emitting winding and a shielding winding or a shielding film is arranged between the first winding and the second winding. Furthermore, the shielding winding and the core are connected to the reference potential of the first winding.

Due to the connection of the core to the reference potential, the reduction of high-frequency interferences between the first winding and the second winding of the transformer is improved. The shielding winding and the core are at the same electrical reference potential in this way, namely preferably the ground potential of the first winding which emits the high-frequency interferences.

In one advantageous embodiment, it is provided that the shielding winding and the core are connected on one side to the reference potential of the first winding.

The device according to the invention is designed in one preferred embodiment variant in such a way that the reference potential is the ground potential of the first winding.

Furthermore, an embodiment is advantageous in which the shielding winding is coupled via a capacitance $C_{pS1}$ to the first winding.

The device is preferably furthermore designed so that the core is coupled via a capacitance $C_{pK1}$ to the first winding.

In one exemplary embodiment of the invention, it is provided that the core is coupled via a capacitance $C_{pK2}$ to the second winding.

Furthermore, it is advantageous if the shielding winding is coupled via a capacitance $C_{pS2}$ to the second winding.

Due to the capacitive coupling between the first winding and the shielding winding and between the first winding and the core, the high-frequency interferences are conducted directly back to the interference source, without propagating on the second winding to be shielded. If a shielding winding is used without simultaneously bringing the core to the reference potential, a part of the interferences can be conducted via the capacitance $C_{pS1}$ to the shielding winding and then to ground, but the core will assume the potential of the interference-emitting first winding due to the parasitic capacitance $C_{pK1}$. These interferences are in turn conducted by the capacitance $C_{pK2}$ to the shielding second winding. Therefore, in the case of a combination of shielding winding and setting the core reference potential, significantly better shielding of the second winding is to be achieved.

In a further advantageous variant, it is provided according to another aspect of the present disclosure that the core is connected to the reference potential of the first winding by a direct galvanic connection by means of a connecting wire.

In one refinement of the present device, it is furthermore provided that the core is connected to the reference potential of the first winding by a capacitive connection by means of a conductive film, which is arranged on a lateral surface of the core.

A further advantageous embodiment variant provides that the core is connected to the reference potential of the first winding by means of a contact spring.

The connection to the reference potential of the first winding is preferably produced directly to a ground pin of the transformer.

In one advantageous embodiment variant, it is provided that the shielding winding is a single-layer, insulated wire winding.

In an alternative exemplary embodiment, the device according to the invention is designed so that if a shielding film is used, this shielding film is a single-layer, electrically conductive film.

In one preferred embodiment of the present disclosure, the second winding represents a winding layer around the first winding and the shielding winding or the shielding film is arranged like a sandwich between the first winding and the second winding around the first winding.

Other advantageous refinements of the invention are characterized in the dependent claims or are described in greater detail hereinafter together with the description of the preferred embodiment of the invention on the basis of the FIGS. 1 to 7, wherein identical reference signs indicate identical structural and/or functional features.

FIG. 1 shows an equivalent circuit diagram of a device for reducing high-frequency interferences of a transformer 1. The first winding $W_1$ and the second winding $W_2$ of the transformer 1 are wound around the common core 2. The first winding $W_1$ is the interference-emitting winding and a voltage U1 is applied. Furthermore, the reference potential B is the ground potential of the first winding $W_1$. In the second winding W2, the voltage U2 is generated. A shielding winding $W_S$ or a shielding film $W_S$ is arranged between the first winding $W_1$ and the second winding $W_2$, which is connected on one side to the reference potential B of the first winding $W_1$. Furthermore, the common core 2 is also connected on one side to the reference potential B.

Figure 2:
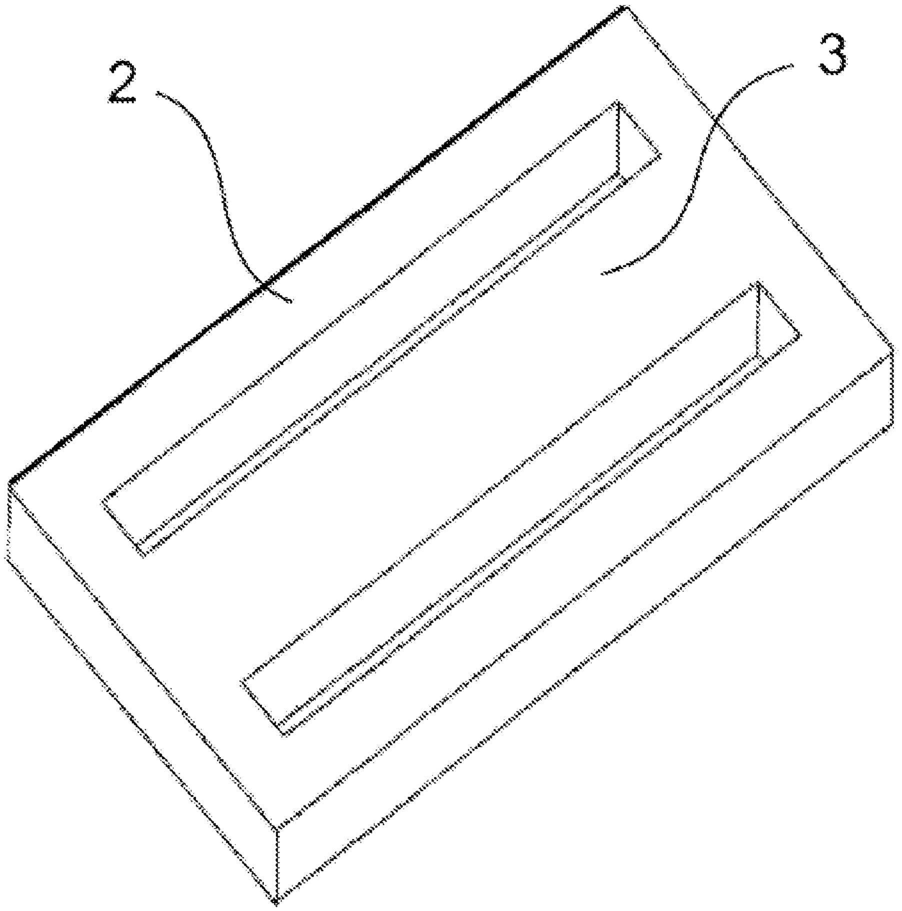
FIG. 2 shows a perspective view of the core.

FIG. 2 shows a perspective view of an embodiment variant of a core 2 of the transformer 1. The cuboid core 2 has two rectangular passage openings along its longitudinal extension, which extend in parallel along the longitudinal extension of the core 2. In this way, a web 3 for winding the core 2 with a corresponding winding through the passage openings is formed in the middle in the core 2.

Figure 3:
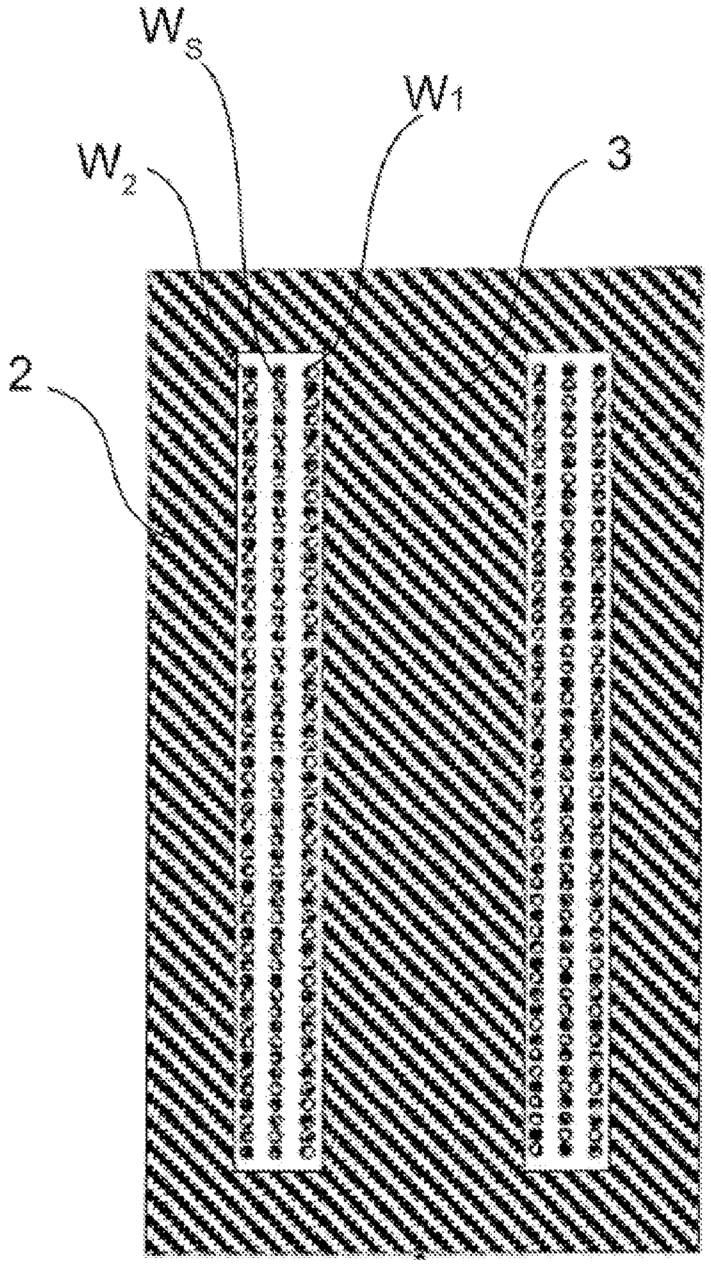
FIG. 3 shows a section through the top view of the core having the three windings.

FIG. 3 shows a section through the top view of the core 2 having the three windings $W_1$, $W_2$, $W_3$. The web 3 of the core 2 of the transformer 1 from FIG. 2 is wound using the three windings $W_1$, $W_2$, $W_S$ so that the second winding $W_2$ represents a winding layer around the first winding and the shielding winding $W_S$ or the shielding film $W_S$ is arranged like a sandwich between the first winding $W_1$ and the second winding $W_2$ around the first winding $W_1$. The windings $W_1$, $W_2$, $W_S$ are single-layer in this case.

Figure 4:
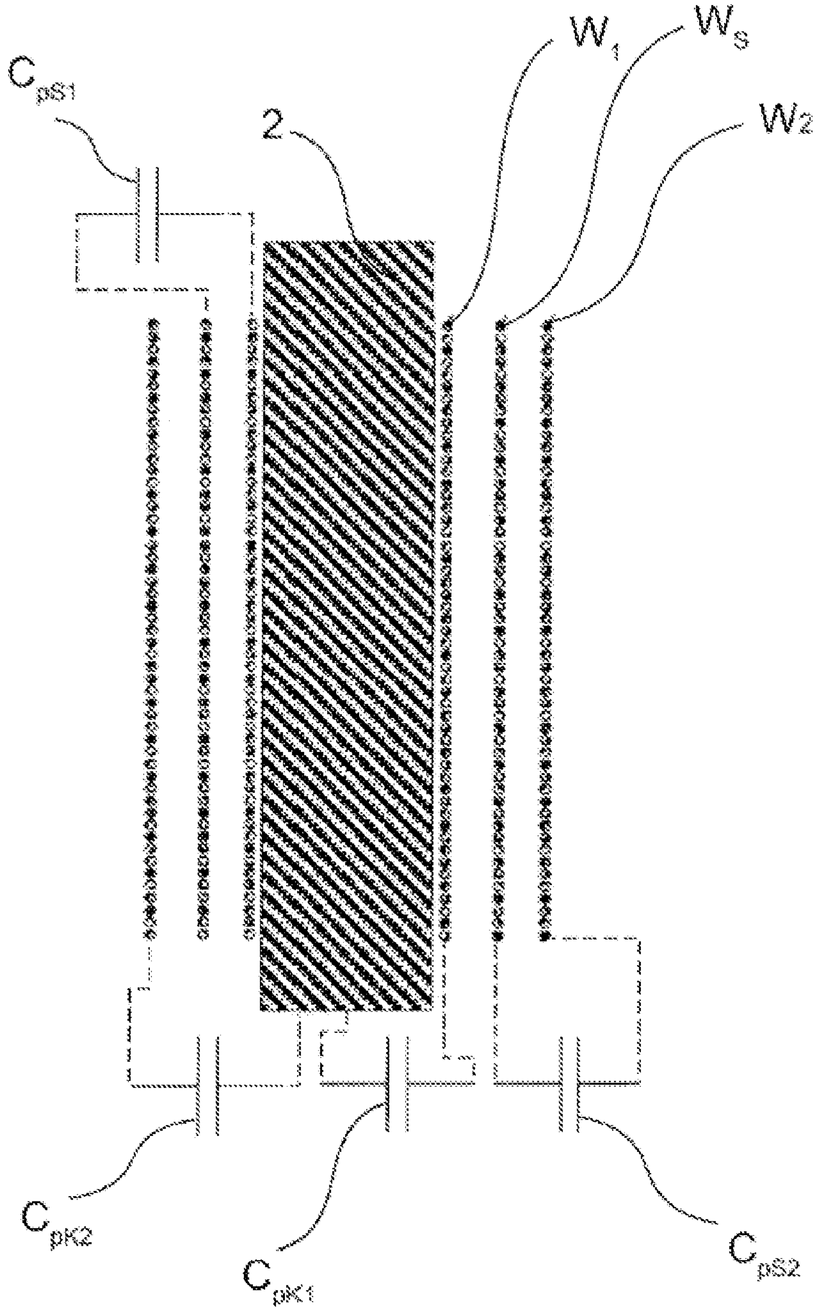
FIG. 4 shows a section through the side view of the core having the three windings.

FIG. 4 shows a section through the side view of the core 2, which is wound using the windings $W_1$, $W_2$, $W_S$. The shielding winding $W_S$ is electrically connected via a capacitance $C_{pS1}$ to the first winding $W_1$. Furthermore, the core 2 is coupled via a capacitance $C_{pK1}$ to the first winding $W_1$ and via a capacitance $C_{pK2}$ to the second winding $W_2$. In addition, FIG. 4 shows that the shielding winding $W_S$ is also coupled via a capacitance $C_{pS2}$ to the second winding $W_2$.

Figure 5:
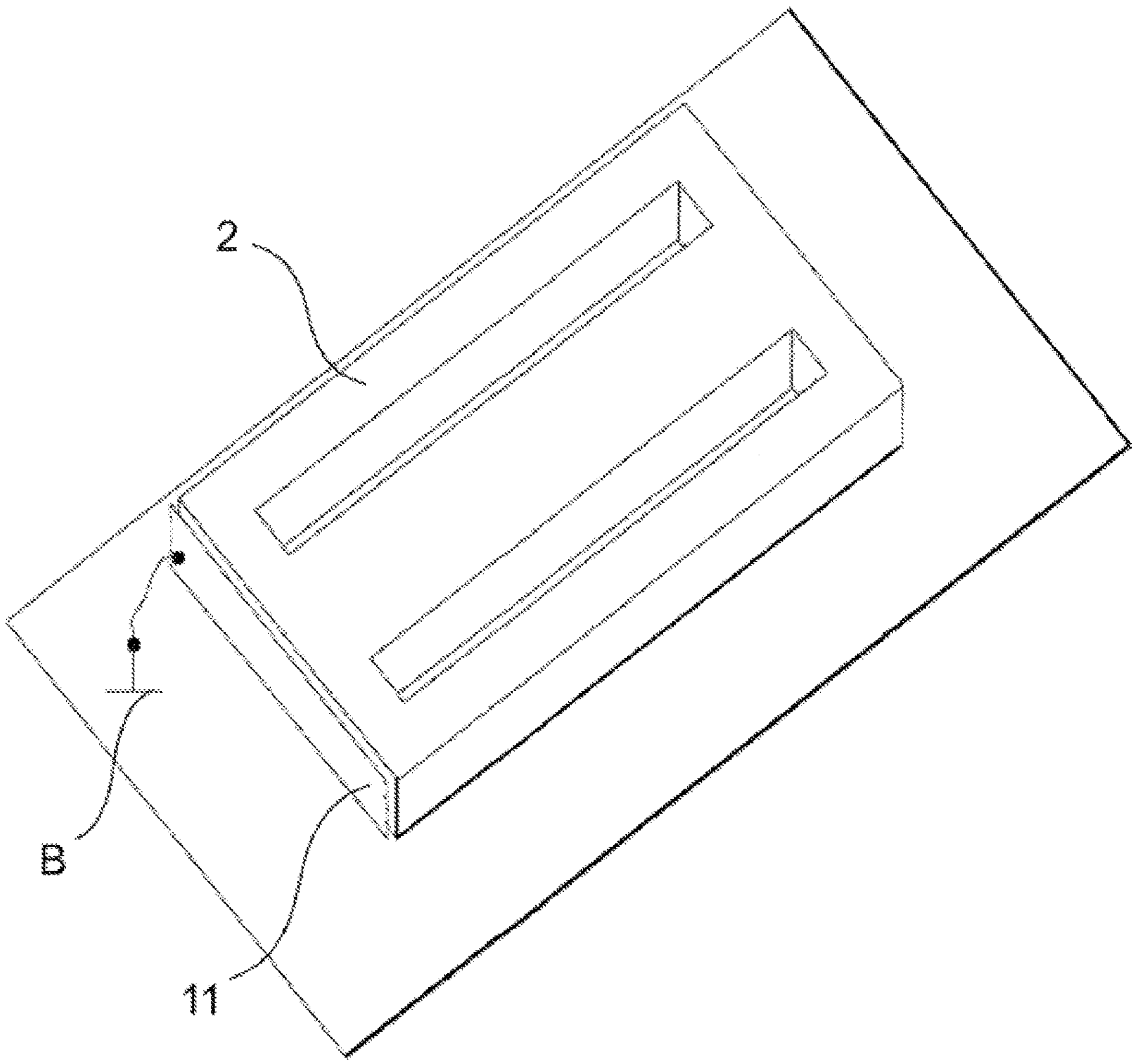
FIG. 5 shows a perspective view of the connection of the core to the reference potential by means of a conductive film.

FIG. 5 is a perspective view of the connection of the core 2 to the reference potential B of the first winding $W_1$ by a capacitive connection by means of a conductive film 11, which is arranged on the lateral surface of the core 2.

Figure 6:
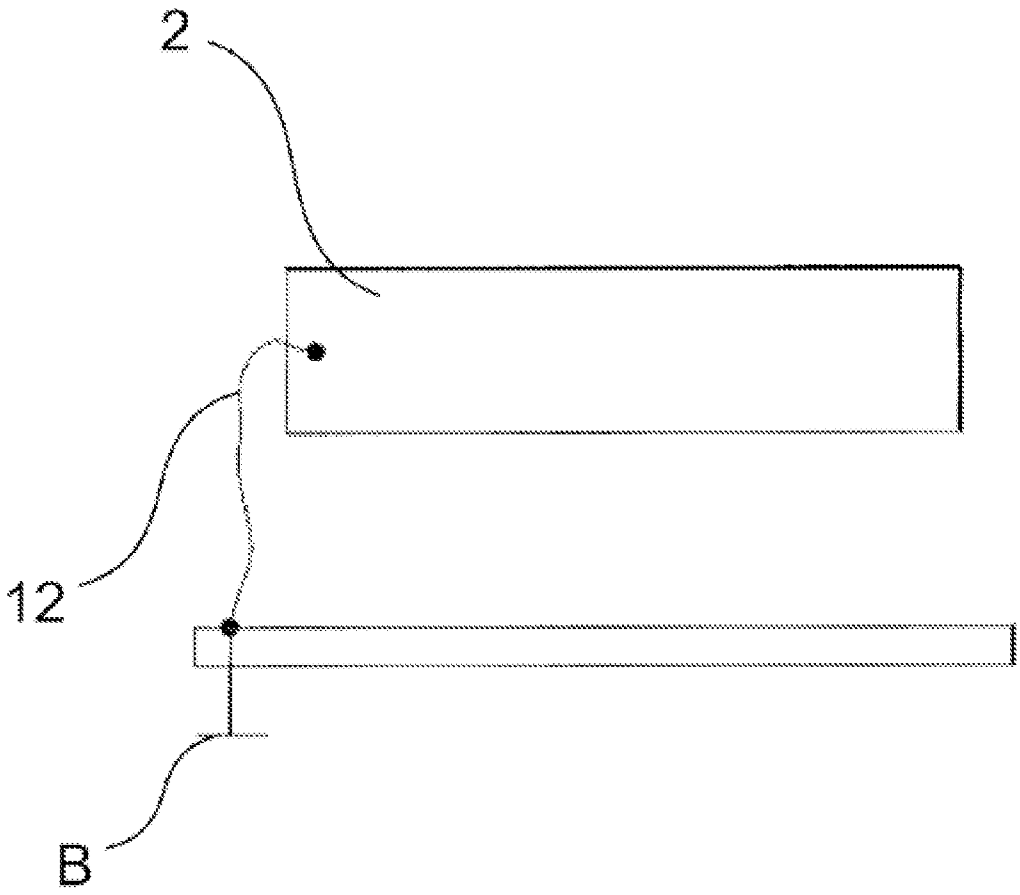
FIG. 6 shows a side view of the connection of the core to the reference potential by means of a connecting wire.

FIG. 6 shows a side view of the connection of the core 2 to the reference potential B of the first winding $W_1$ by a direct galvanic connection by means of a connecting wire 12.

Figure 7:
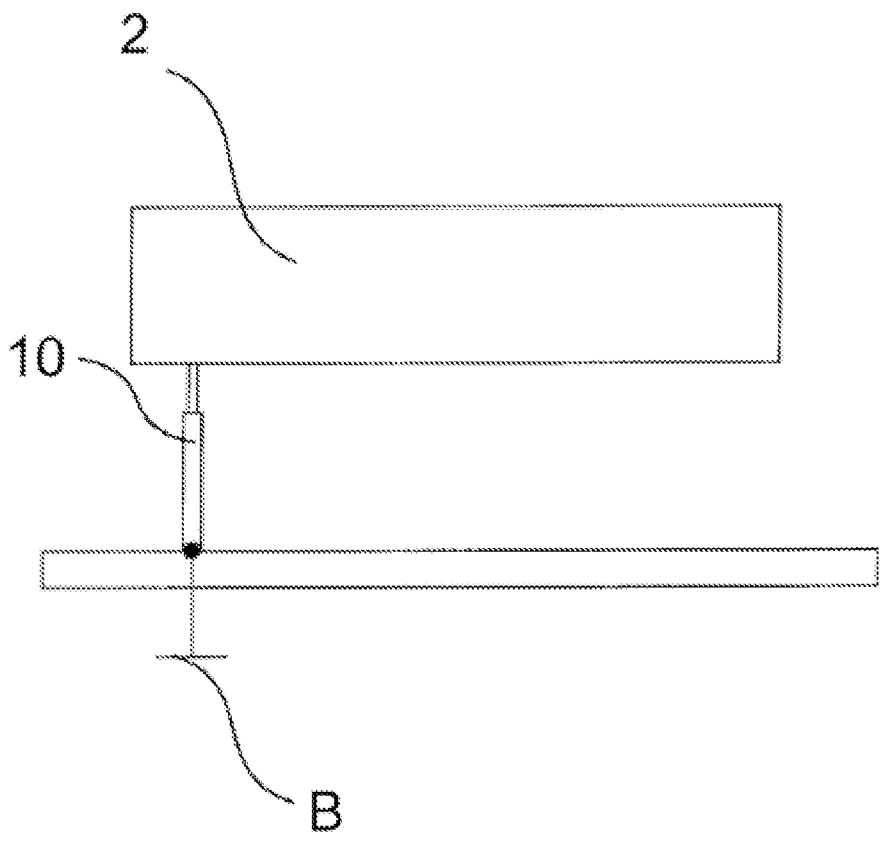
FIG. 7 shows a side view of the connection of the core to the reference potential by means of a contact spring.

Furthermore, a side view of the connection of the core 2 to the reference potential B by means of a contact spring 10 is shown in FIG. 7.

While the above description constitutes the preferred embodiments of the present invention, it will be appreciated that the invention is susceptible to modification, variation and change without departing from the proper scope and fair meaning of the accompanying claims.

The invention claimed is:

1. A device for reducing high-frequency interferences between a first winding (W1) and a second winding (W2) of a transformer, which are wound around a common core, wherein the first winding (W1) is an interference-emitting winding and a shielding winding (WS) or a shielding film (WS) is arranged between the first winding (W1) and the second winding (W2), wherein the shielding winding (WS) and the core are connected to the reference potential (B) of the first winding (W1);

wherein the shield winding (WS) is coupled to the first winding (W1) via a first capacitance CpS1 and to the second winding (W2) via a second capacitance CpS2;

wherein the core (2) is coupled to the first winding (W1) via a first capacitance CpK1 and to the second winding (W2) via a second capacitance CpK2.

2. The device as claimed in claim 1, characterized in that the shielding winding (WS) and the core are connected on one side to the reference potential (B) of the first winding (W1).

3. The device as claimed in claim 1, characterized in that the reference potential (B) is the ground potential of the first winding (W1).

4. The device as claimed in claim 1, characterized in that the core is connected to the reference potential (B) of the first winding (W1) by a direct galvanic connection by means of a connecting wire.

5. The device as claimed in claim 1, characterized in that the core is connected to the reference potential (B) of the first winding (W1) by a capacitive connection by means of a conductive film, which is arranged on a lateral surface of the core.

6. The device as claimed in claim 1, characterized in that the core is connected to the reference potential (B) of the first winding (W1) by means of a contact spring.

7. The device as claimed in claim 4, characterized in that the connection to the reference potential (B) of the first winding (W1) is produced directly to a ground pin of the transformer.

8. The device as claimed in claim 4, characterized in that the shielding winding (WS) is a single-layer, insulated wire winding.

9. The device as claimed in claim 4, characterized in that the shielding film (WS) is a single-layer, electrically conductive film.

10. The device as claimed in claim 1, characterized in that the second winding (W2) represents a winding layer around the first winding and the shielding winding (WS) or the shielding film (WS) is arranged like a sandwich between the first winding (W1) and the second winding (W2) around the first winding.

11. The device as claimed in claim 2, wherein the reference potential (B) is the ground potential of the first winding (W1).

12. The device as claimed in claim 11, wherein the shielding winding (WS) is coupled via a capacitance CpS1 to the first winding (W1) and via a capacitance CpS2 to the second winding (W2), wherein the core is coupled via a capacitance CpK1 to the first winding (W1), and via a capacitance CpK2 to the second winding (W2).

13. The device as claimed in claim 1, wherein the core is connected to the reference potential (B) of the first winding (W1) by one selected from the group consisting of a direct galvanic connection by means of a connecting wire, a capacitive connection by means of a conductive film that is arranged on a lateral surface of the core, and a contact spring.

14. The device as claimed in claim 13, wherein the connection to the reference potential (B) of the first winding (W1) is produced directly to a ground pin of the transformer.

15. The device as claimed in claim 14, wherein the shielding winding (WS) is a single-layer, insulated wire winding or a single-layer, electrically conductive film.

16. The device as claimed in claim 15, wherein the second winding (W2) represents a winding layer around the first winding and the shielding winding (WS) or the shielding film (WS) is arranged like a sandwich between the first winding (W1) and the second winding (W2) around the first winding.

* * * * *